Nov. 14, 1939.   A. P. BERENDSEN   2,179,477
VEHICLE
Filed Feb. 10, 1937
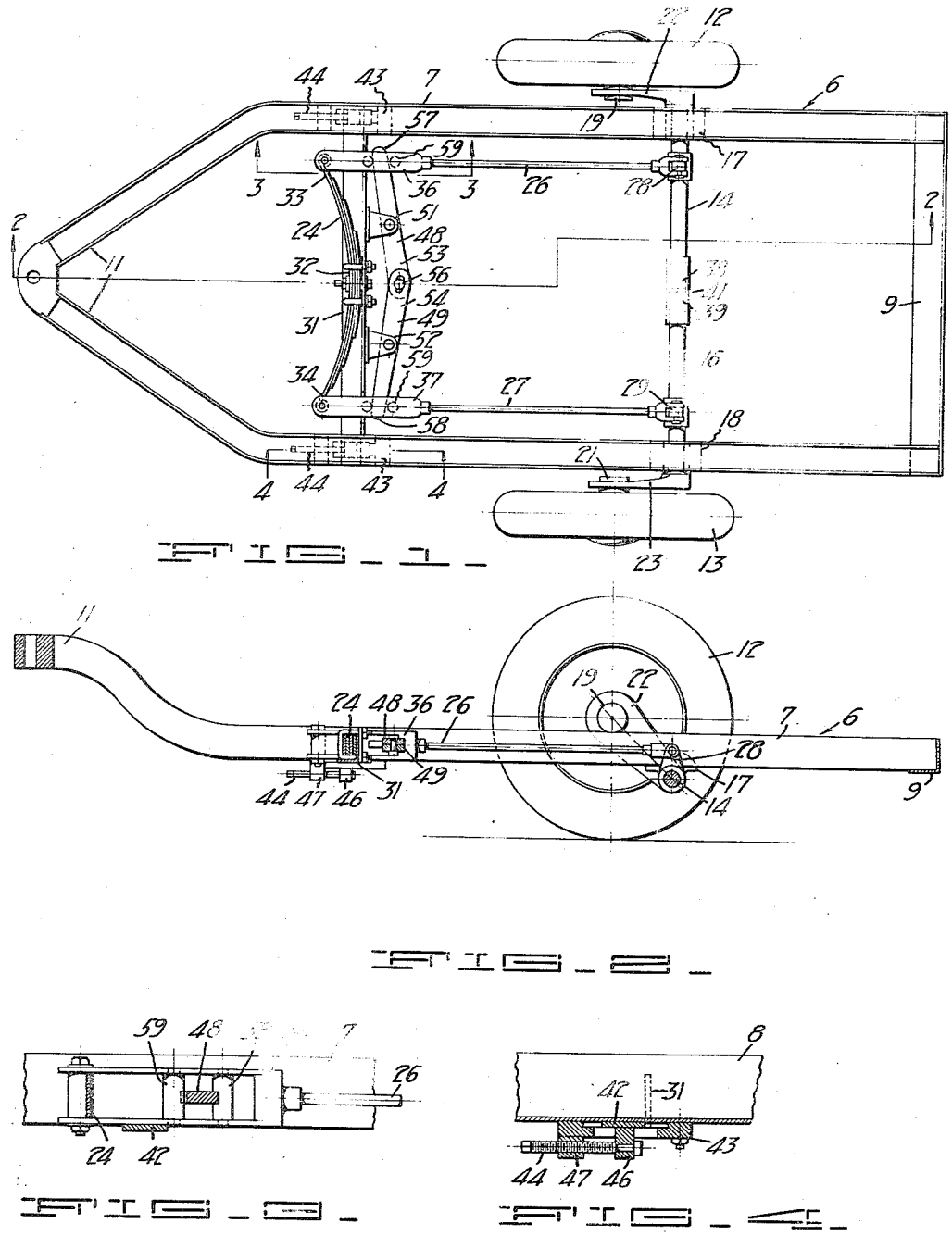
INVENTOR.
Andrew P. Berendsen.
BY Joseph B. Gardner
ATTORNEY.

Patented Nov. 14, 1939

2,179,477

UNITED STATES PATENT OFFICE 2,179,477

VEHICLE

Andrew P. Berendsen, Concord, Calif.

Application February 10, 1937, Serial No. 124,975

5 Claims. (Cl. 267—19)

The invention relates to vehicles such as automobiles, trailers and the like and more particularly to the wheel suspension mechanism for such vehicles.

An object of the present invention is to provide in a vehicle of the character described a wheel suspension mechanism which will afford a substantial reduction in the height of the body frame of the vehicle over the road and will afford a substantial increase in the width of such frame and thereby produce a lower center of gravity and an improved road stability over that of previous vehicles of analogous design.

Another object of the present invention is to provide a vehicle of the character described having a wheel suspension mechanism providing for the separate and independent resilient suspension of each of the wheels and in addition providing for an improved safety means for safeguarding against a collapse of the support upon breakage of one of the supporting units and in further affording an improved stabilizing of the independently operating suspension units.

A further object of the invention is to provide in a vehicle of the character described, means for adjusting the road clearance of the body frame of the vehicle.

Still another object of the invention is to provide a vehicle of the character described which will be made up of a minimum number of simply and sturdily constructed parts which are assembled and arranged in a manner enabling a ready replacement or repair of the several parts.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claims.

Referring to said drawing:

Figure 1 is a plan view of a vehicle constructed in accordance with the present invention.

Figure 2 is a longitudinal vertical cross-sectional view of the vehicle shown in Figure 1 and is taken substantially on the plane of line 2—2 of Figure 1.

Figure 3 is a fragmentary vertical sectional view taken substantially on the plane of line 3—3 of Figure 1.

Figure 4 is a fragmentary vertical sectional view taken substantially on the plane of line 4—4 of Figure 1.

For the purpose of disclosure the present invention is illustrated in the accompanying drawing by application of the invention to a two-wheel trailer for use with which the present invention is particularly applicable, although, as will be understood, the invention may be applied to substantially all types of wheeled vehicles. The trailer here shown is composed of a body frame 6 having opposed longitudinally extending sides 7 and 8 and rear and front ends 9 and 11, the latter being arranged for connection to and supported on any suitable motor driven vehicle. The frame is adapted to carry a body in the usual manner and is supported by means of a pair of wheels 12 and 13 mounted at the outside of the frame members 7 and 8. The wheels are secured to the frame with the axes of the wheels substantially aligned transversely of the frame by a leverage crank means including a pair of transverse shafts 14 and 16 rotatably mounted on the frame sides 7 and 8 in supporting bearings 17 and 18 and are connected at their outer ends to the hub portions 19 and 21 of the wheels by crank arms or levers 22 and 23 so as to secure the wheels to the frame in a manner permitting a relative vertical displacement between the wheels and frame on rotation of the shafts 14 and 16. This latter rotation of the shafts is resiliently resisted by a resilient torque means including a flat leaf spring 24 acting through connecting rods 26 and 27 and the crank arms 28 and 29 mounted on the shafts 14 and 16. In accordance with the present arrangement, and as illustrated in Figure 1 of the drawing, the spring is mounted with its length extending generally transversely or widthwise with respect to the frame and is supported on the frame by means of a frame crosspiece 31 which is rigidly secured to a mid-portion 32 of the spring. By reason of this support the opposite free ends 33 and 34 of the spring may flex relative to the frame and are here pivotally secured to the rods 26 and 27 by means of bifurcated brackets 36 and 37.

It will be clear from the foregoing that the resilient torque applied to the shafts 14 and 16 by the medium of the spring 24 and the crank arms 28 and 29 on the shaft provides an independent resilient suspension for each of the wheels 12 and 13 and that by reason of the positioning of the wheels at the outer sides of the frame and the suspension of such wheels on the crank arms 22 and 23, the frame may be substantially wider than heretofore and arranged with the plane thereof substantially below the axes of the wheels. Both of these latter features are important in that they produce a lower center of gravity and greater road stability than similar vehicles heretofore used and also afford the use of a roomier vehicle body. Preferably, in order to add material strength and rigidity to the wheel suspension units, the shafts 14 and 16 are extended inwardly so as to dispose their inner ends 38 and 39 in adjacent aligned position and are connected by means of a sleeve 41 which serves to rigidly hold these inner shaft ends in alignment while, at the same time, permitting relative rotation of the shafts. In this manner the separate shafts 14 and 16 are given a strength and rigidity as could be otherwise obtained only by the use of a one-piece shaft while still leaving the shafts free for individual rotation.

As another important feature of the present construction, means is provided for adjusting the height or road clearance of the frame 6. This is here effected by causing a physical displacement of the spring 24 longitudinally of the frame with respect to the shafts 14 and 16 so as to vary the resilient torque applied to those shafts. As here shown, the opposite ends 42 of the cross member 31 are slidably carried in guide brackets 43 secured to the frame sides 7 and 8 and are adjusted longitudinally of the frame by means of screws 44 which, in the present case, are journalled in lugs 46 on the ends 42 and are threaded through an adjacent portion 47 of the brackets. It will thus be understood that by adjustment of these screws the relative position of the wheels with respect to the frame may be controlled and as a result, the frame may be adjusted into desired position over the road. This is of considerable importance in controlling the road clearance of the trailer for various loads carried by the trailer.

Another important feature of the present invention is the use of a safety stabilizing means which is connected to the separate wheel suspension units and serves to limit the individual operation of these units and to bring into operation both ends of the spring 24 upon a non-uniform burdening of one of the suspension units. This means consists generally of a leverage system which is connected to the frame and to the independent suspension units so as to limit the movement of one unit without causing a corresponding movement of the other unit. More specifically, the means includes a pair of levers 48 and 49 which are pivoted intermediate their ends as by brackets 51 and 52 to the cross piece 31 and are connected at their inner ends 53 and 54 for pivotal movement by means of a slip joint 56 and are engaged at their outer ends 57 and 58 between a pair of longitudinally spaced vertically extending guides 59 in the brackets 36 and 37. In this manner a longitudinal movement of one of the brackets 36 and 37 will be accompanied by a fulcruming of one of the levers 48 and 49 and a forced movement of the other lever at the slip joint 56 which thereby causes the fulcruming of said other lever and the longitudinal displacement of the other bracket in accordance with the displacement of the first bracket. As a result of the above, it will be readily seen that a road shock incident at one side of the vehicle will not cause a corresponding movement of only that side of the vehicle but will be relayed through the levers 48 and 49 and partially absorbed at the opposite side of the vehicle whereby the sidesway caused by the road shock will be reduced to a minimum. Also, and as will be readily understood, should one side of the spring 24 break or become partially incapacitated through breakage of one or more of the spring leaves the leverage stabilizing system will immediately operate to the support of such spring side and the wheel suspension unit connected thereto from the opposite unbroken side of the spring without any danger of incurring a collapse of the wheel support connected to the broken spring side.

I claim:

1. A vehicle comprising, a body frame, wheels, lever means pivoted to said frame and connected to said wheels for supporting the latter at the opposite sides of said frame and for movement of the axes of said wheels vertically with respect to said frame, a transverse spring carried by said frame in spaced relation to said lever means, means connecting said spring to said lever means for applying a resilient torque to the latter urging a downward movement of said wheel axes relative to said frame, and means for moving the position of said spring on said frame for adjusting the position of said wheel axes relative to said frame.

2. A vehicle comprising, a frame, a flat spring carried by said frame and supported adjacent the center of said spring to permit relative flexing of the outer ends thereof, a plurality of cranks mounted on said frame and connected to the ends of said spring, wheels carried by said cranks for supporting said frame and being resiliently suspended therefrom by said spring and cranks, and a plurality of levers connecting the ends of said spring and effective to distribute the force of said wheels to said spring ends.

3. A vehicle comprising, a frame, a plurality of wheel supporting members mounted for individual vertical movement relative to said frame, single resilient means connecting said wheel supporting members to said frame and providing a limited resilient individual vertical displacement of each of said wheels relative to said frame, and means connecting said wheel supporting members for causing their movement together as a substantially rigid unit upon movement of one of said members over and above said limited resilient movement.

4. A vehicle comprising, a frame, a plurality of wheel supporting members mounted for individual vertical movement relative to said frame, a cross member mounted on said frame, a flat spring mounted intermediate its ends to said cross member and having the opposite free ends thereof connected to said wheel supporting members for unitarily supporting the latter from said frame and providing an individual resilient vertical suspension of said members from said frame, and means for individually moving the ends of said cross member longitudinally to adjust the road pressure of the wheels.

5. A vehicle comprising a frame, a plurality of wheels, a plurality of wheel supporting members each having an axle pivotally secured to said frame and each adapted to support a wheel for individual vertical movement thereof relative to said frame, a flat spring connected to said frame and said wheel supporting members for unitarily supporting said wheels from said frame, and means providing a limited individual resilient vertical movement of said wheels relative to said frame, said axles of said wheel supporting members being extended from their pivotal mountings on said frame to a means adjacent the center of said vehicle whereby said axles are permitted relative rotation with individual vertical movement of said wheels but are held against other relative movement.

ANDREW P. BERENDSEN.